July 16, 1968
C. B. MARTIN
3,393,353
MOTOR SPEED CONTROL SYSTEM
Filed Oct. 14, 1965
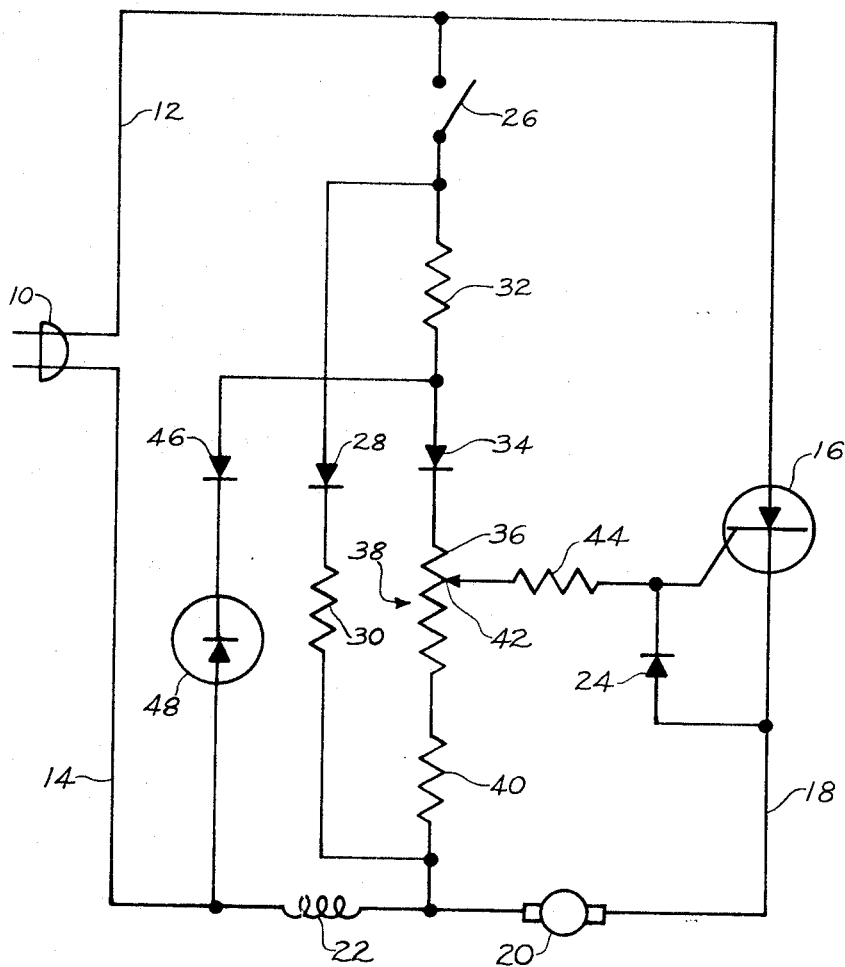
Inventor:
Charles B. Martin
Gradolph, Love & Rogers
Attorneys

United States Patent Office 3,393,353
Patented July 16, 1968

3,393,353
MOTOR SPEED CONTROL SYSTEM
Charles B. Martin, Chicago, Ill., assignor to Victor Comptometer Corporation, Chicago, Ill., a corporation of Illinois
Filed Oct. 14, 1965, Ser. No. 495,914
6 Claims. (Cl. 318—331)

ABSTRACT OF THE DISCLOSURE

An A.C. universal motor speed control system of the silicon controlled rectifier type which accomplishes substantially instantaneous regulation by providing feedback in the forward direction for both load and ambient voltage variations and thus eliminates the need for capacitors. Speed regulation can be within 1% with either a 20% change in line voltage or a 20% change in load over a very wide dynamic range.

---

This invention relates to motor speed control systems, particularly for the speed regulation of series wound universal motors and especially to the regulation of such motors when used in applications where the torque loading is highly variable, or where high torque is required at low speed. There are, of course, only suggested applications, since other uses will suggest themselves.

One of the objects of this invention is to provide a novel motor control system of this type which has an extremely high dynamic range.

Another object is to provide a novel system of this character which has very good speed regulation over wide fluctuations in ambient voltage.

Yet another object is to provide a novel speed regulating system which is extremely fast in its response to changes in required motor speed, to changes in torque requirements, and to changes in ambient voltage.

Still another object is to provide a novel motor speed regulating system in which there is a high order of control feedback to produce appropriate compensating effects both for speed variation and for voltage fluctuation over a wide range of conditions.

Another objective is to provide a novel speed regulating system of the type set forth above, which permits the motor to have full available torque at stall, unlike prior speed regulating systems with which I am familiar.

Still another object is to accomplish the above without the use of mechanical governors and/or cycling contacts.

Other objects will become apparent from the following description of a preferred embodiment of the invention which is illustrated in the accompanying drawing.

In the drawing, the figure is an electrical circuit diagram of a universal motor and control system therefor in which the invention is embodied.

Universal motors of the common series type have a wide range of applications. They are mostly used in AC circuits and have the characteristics of providing high output considering their size, and high starting torque. They have the disadvantage, however, of not being well regulated; that is, variations in ambient voltage at a constant load or variations in the load at a constant voltage have a pronounced effect upon the motor speed.

In the past, several approaches have been made to the solution of this problem, but known solutions are of limited utility, because either they make use of mechanical governors and/or cycling contacts which obviously have undesirable aspects, or else they compensate only within a limited range, or only for certain specific variables. As an example, feedback systems from the armature, using residual magnetism to generate the feedback—such as form the subject matter of Patent Nos. 2,939,064; 2,981,880; or 3,058,044—are not adequate for some purposes, since the speed regualtion with load change is relatively poor and there is no speed regulation whatever for voltage fluctuations. Other systems using feedback from the armature during negative alternations are slow of response to load changes and do not compensate for voltage variations. Still another system uses current feedback and compensates well for load variations, but gives positive feedback for voltage variations, and therefore is worse than no regulation at all so far as voltage changes are concerned.

Briefly, the prior art, so far as is known, shows systems which compensate to a greater or lesser extent for load variations, but no one gives any adequate compensation for voltage variations. Furthermore, the systems which compensate well for load variations have a deleterious effect upon the torque at low speed or at stall. These deficiencies it is the purpose of this invention to overcome.

An example of a universal motor application which is reasonably severe and which will, therefore, illustrate the problem is to be found in electrically driven mechanical calculators. During a portion of the operating cycle, the motor will run under a condition of substantially no load and will tend to overspeed. Again, it will be confronted with a condition of full or partial load, depending upon the combination of levers and other mechanical elements to be actuated. These changes in load condition take place instantaneously, and call for instantaneous response of the speed regulating system if maximum efficiency is to be achieved. Furthermore, the motor may be required to start from the stall condition under full load, and of course such calculators will be called upon to operate under conditions of wide voltage variation. This problem is compounded by the fact that the motor should be of minimum size; that is, it cannot reasonably have much excess capacity because of space, weight, and cost limitations.

So far as is known, only the mechanical governor system even approximately meets these requirements, but it has disadvantages which it is well to avoid. These disadvantages, however, need no discussion here, since they are well appreciated, and since the present system is of the entirely different silicon controlled rectifier type.

Obtaining speed regulation by means of silicon controlled rectifier circuits is not broadly new, but all the systems with which I am familiar are subject to the limitations previously mentioned; that is, they do not compensate sufficiently for load changes, or they do not do it quickly enough, or they reduce the torque at low speed and at stall, or they do not compensate for voltage variation. In fact, all systems that I know of fail in more than one of these respects.

In the following description of a preferred embodiment of the invention, it will be assumed as an example that the motor is for mechanical calculator use and develops about 1/50 H.P. on a nominal 110-v. A.C. circuit and draws about 1 a. at full rated load. The scale of the values used in the circuit can, of course, be changed from those specified to suit motors of different characteristics. With a specific standard calculator motor, the particular system to be described made possible a regulation of motor speed within less than 1% with either a 20% change in line voltage between 90 v. and 130 v., or a 20% change in load from zero to 140% of rated load. Also the motor would pull the calculator out of stall at 85 v. and the feedback for speed regulation was substantially instantaneous.

Referring to the drawing, a plug for connecting the system to the available A.C. power supply is indicated at 10.

The two sides of the line connected to the plug are shown at 12 and 14. One side, 12, is connected to the anode of a silicon controlled rectifier 16, the cathode of which is connected to a lead 18, connected in turn through the motor armature 20 and thence through the one or more motor field coils 22 to the other side of the line 14. The gate of the silicon controlled rectifier is also connected to the cathode of a diode 24, the anode of which is connected to the lead 18. The motor start-stop switch is shown at 26 and has one side thereof connected to the lead 12. The other side of switch 26 is connected to the anode of a diode 28, the cathode of which is connected through a resistor 30 to the common point between the armature 20 and field 22. A parallel path is established from the switch 26 by way of a resistor 32 to the anode of diode 34, and from the cathode of diode 34 through the resistor element 36 of a potentiometer 38, and thence through a resistor 40 to the common point between the armature 20 and field 22. The slider 42 of potentiometer 38 is connected through a resistor 44 to the gate of the rectifier 16. The common point between resistor 32 and the diode 34 is connected to the anode of a diode 46, the cathode of which is connected to the cathode of a Zener diode 48, the anode of which is connected to the lead 14.

In a specific embodiment of this circuit used for regulating a calculating machine motor of the type set forth above, the following components and values were found to be suitable:

Silicon controlled rectifier 16: Type C20B;
Zener diode 48: Type 1N1767;
Diodes 24, 28, 34, and 46: Type 1N4004;
Resistors in ohms: 30—4700; 32—1500; 36 and 44—100; 40—56.

Note that one of the important advantages of this circuit is that it uses no capacitors, and the response of the circuit with transient conditions is, therefore, extremely rapid.

In general the speed regulating system of this invention utilizes feedback from the armature 20 to control motor speed, both for variations in load and for fluctuating voltage. The system uses a field reference current to sense changes in load, and a field current change with voltage to sense line voltage fluctuations. Unlike most systems, the feedback influence is generated during the positive alternations, and its effectiveness upon the system occurs by regulating the gate current just before the SCR (silicon controlled rectifier) conducts. No feedback is effective while the SCR is conductive, and no feedback is influential during the negative alternations.

More particularly, the cycle begins upon closure of the start-stop switch 26. For a short period, while the motor is coming up to speed, there is very little feedback and the SCR conducts throughout substantially the entire positive alternation. The motor, therefore, develops substantially its full starting and accelerating torque, which is of course desirable.

Once the motor approaches the designed running speed, each positive alternation begins with the SCR nonconductive. As the voltage rises from zero during the positive alternation a current begins to flow through the speed adjusting reference network comprised of resistor 40, resistor 36, diode 34, and resistor 32, and also through the line voltage sensing network comprised of resistor 30 and diode 28. Current conducted through these parallel paths also passes through the field 22 between the leads 14 and 12. This field current causes the armature, now turning at about normal rated r.p.m., to generate the feedback voltage.

The SCR turn-on voltage, the voltage across resistor 40 and the lower portion of potentiometer resistor 36, causes SCR gate current to flow and this turn-on voltage is opposed by the feedback voltage, so that the point on the cycle where conduction through the SCR begins is determined by the difference between these voltages. The turn-on voltage has a substantially constant wave form because of the reference supplied by the Zener 48, but the feedback voltage fluctuates with line voltage and with motor load, and as stated, it is the instantaneous difference between these voltages that determines when the SCR turns on, or begins to conduct.

In general, the components in the circuit function as follows, to bring about this result. The Zener 48 provides a constant reference voltage even through line voltage and load conditions change. The diode 46 in this same circuit blocks current through the Zener during negative alternations, and also increases the slope of the top side of the Zener reference (or turn-on voltage) during the positive alternations; that is, it contributes its own reduction of resistance with increased current characteristic to the Zener circuit.

In the speed adjusting reference network, resistor 32 limits the current through the circuit during positive alternations. This resistor is chosen to adjust the field current to an optimum value for feedback generation with variable motor torque. The diode 34 blocks field current in the circuit during negative alternations; also, it prevents excessive Zener current while the SCR is conductive and protects the SCR gate from negative voltage. The potentiometer slide 42 is used to adjust the motor speed and resistor 44 limits the gate current of SCR 16.

The circuit through resistor 30 senses line voltage change, and the value of resistor 30 is so chosen as to adjust the field current to an optimum value for line voltage feedback. The diode 28 blocks current through the resistor 30 and field 22 during negative alternations.

The resistor 40 is selected to choose the optimum range of the SCR gate firing characteristic. The diode 24 provides a D.C. armature shunt which has a vernier effect on regulation for varying load and also prevents negative potentials from appearing at the gate. For long service life, the gate characteristics should remain stable, and the diodes 24 and 34 provide this reliability.

The SCR, of course, functions as a switch to control motor power by lengthening or shortening the portion of the positive cycles supplied to the motor.

This circuit regulates for line voltage variations because the Zener 48 provides a constant voltage reference, but the total field current prior to SCR conduction changes as the line voltage changes. Thus, as the line voltage increases, the field current rises through the line voltage sensing resistor 30. This increases the feedback voltage which opposes the turn-on voltage, and therefore delays the turn-on point. Increase in line voltage, therefore, shortens the time of energization of the motor during each cycle, such that the total electric power supplied to the motor remains essentially constant regardless of voltage fluctuations within a reasonable range, which as indicated previously can be rather broad.

When the load upon the motor is increased, the motor speed tends to decrease. Reduction in speed, however, results in less induced armature feedback voltage being generated, and therefore the SCR turns on earlier each cycle, since there is less feedback voltage to oppose the turn-on voltage. The result, therefore, is that an increase in motor load results in an increase in the electric power supplied to the motor, with the ultimate result that the motor speed is reduced only slightly, as has been previously indicated.

Adjustment of the potentiometer slider 42 changes the relative effectiveness of the feedback voltage and the turn-on voltage at the SCR gate, and therefore shifts the motor speed upwardly or downwardly as desired.

From the above description of a preferred embodiment of this invention it will be appreciated that various may be made in the system without departing from the scope and spirit of the invention, and that, therefore, the scope of the invention is to be measured by the scope of the following claims.

Having described the invention, what I claim as new and useful and desire to protect by Letters Patent of the United States is:

1. In a substantially instantaneously responding speed regulating system for an electric motor subject to load and voltage variation, said motor having series connected field and armature windings fed from an A.C. supply line, a solid state controlled rectifier having an anode-cathode circuit in series with said field and armature windings, a gate-cathode control circuit for said rectifier, circuit means for supplying a substantially fixed speed reference voltage connected to said gate for potentially biasing said gate-cathode circuit on for at least the major portion of the positive half cycles through said anode-cathode circuit, an armature feedback circuit for supplying a variable feedback voltage in the forward direction connected to said cathode for variably opposing said fixed biasing voltage, and a second circuit for increasing said armature feedback voltage with an increase in line voltage, said second circuit being connected for supplying an increased current in the forward direction through said field with an increase in the voltage present in said A.C. supply line such that said controlled rectifier is biased on during portions of the positive half cycles by the difference between said reference voltage and the opposing armature feedback voltage as increased or decreased respectively by an increase or decrease in line voltage.

2. The system called for in claim 1 including means for adjusting motor speed, the last said means including means for adjusting the value of said reference voltage.

3. The system called for in claim 1 in which said fixed reference voltage circuit and said field current increasing circuit include diode means for preventing current flow therethrough during the negative half cycles.

4. The system called for in claim 1 including means for preventing said gate from becoming negative relative to said cathode and for establishing a D.C. shunt around said armature.

5. The system called for in claim 3 including means for preventing said gate from becoming negative relative to said cathode and for establishing a D.C. shunt around said armature.

6. The system called for in claim 1 in which said speed reference voltage circuit includes connections through said field.

References Cited

UNITED STATES PATENTS

| | | | |
|---|---|---|---|
| 3,165,688 | 1/1965 | Gutzwiller | 318—345 X |
| 3,171,074 | 2/1965 | Momberg et al. | 318—345 X |
| 3,271,648 | 9/1966 | Weed | 318—331 |
| 3,329,879 | 7/1967 | Wigington | 318—345 X |

ORIS L. RADER, *Primary Examiner.*

J. J. BAKER, *Assistant Examiner.*